May 6, 1941.  A. W. MILLS ET AL  2,240,568
SHEET FEEDING APPARATUS
Filed June 23, 1939  9 Sheets-Sheet 4

May 6, 1941.  A. W. MILLS ET AL  2,240,568

SHEET FEEDING APPARATUS

Filed June 23, 1939   9 Sheets-Sheet 6

INVENTORS
ATTORNEY

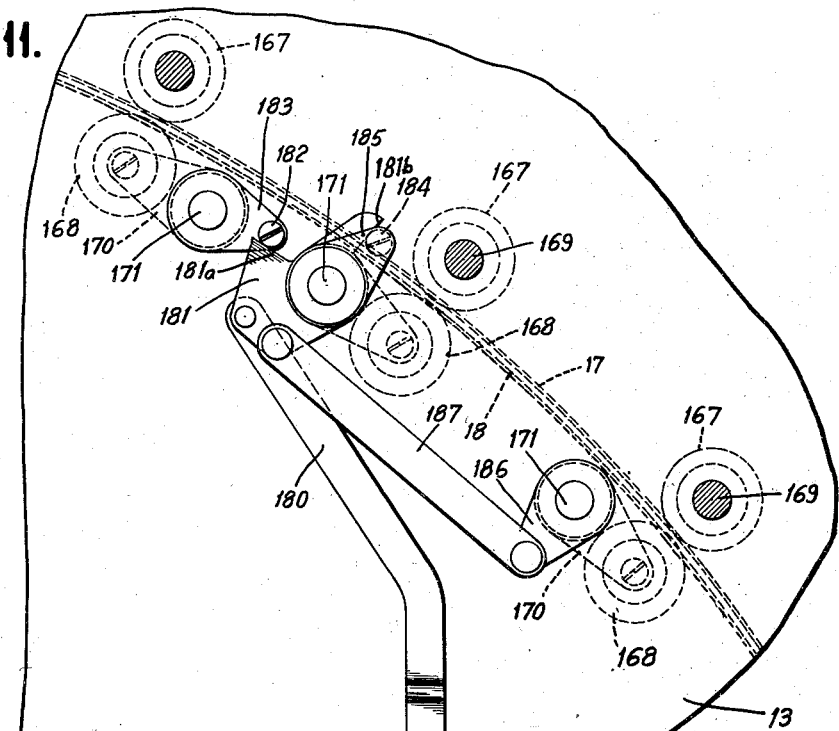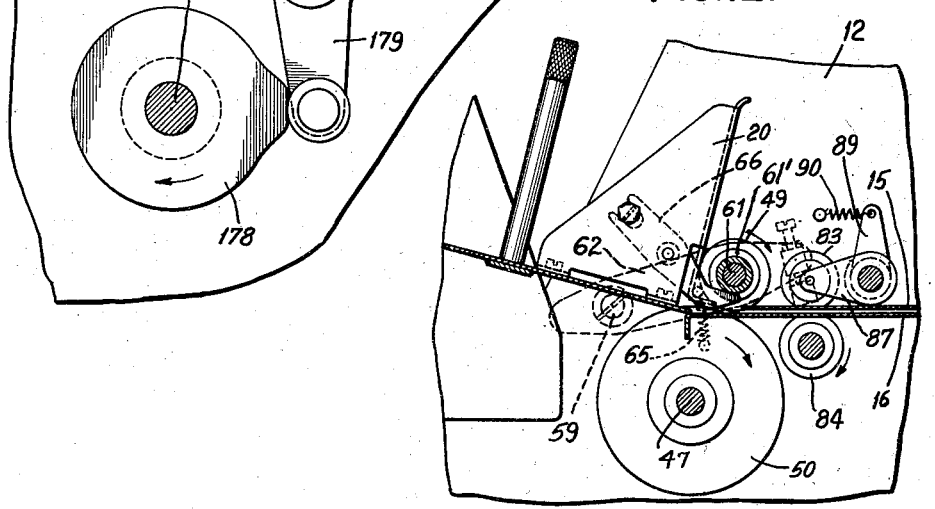

May 6, 1941.　　A. W. MILLS ET AL　　2,240,568
SHEET FEEDING APPARATUS
Filed June 23, 1939　　9 Sheets-Sheet 8

INVENTORS
Albert W. Mills
Frank J. Furman
Sigurd L. Walter
BY
ATTORNEY

Patented May 6, 1941

2,240,568

UNITED STATES PATENT OFFICE 2,240,568

SHEET FEEDING APPARATUS

Albert W. Mills, Endicott, Frank J. Furman, Vestal, and Sigurd L. Walsoe, Binghamton, N. Y., assignors to International Business Machines Corporation, New York, N. Y., a corporation of New York Application June 23, 1939, Serial No. 280,772

11 Claims. (Cl. 197—130)

This case relates to work handling means for a recording apparatus, such as a typewriter or the like.

The term "sheet" may be used hereinafter to denote a letter sheet, envelope, or similar work.

The general object of the invention is to provide novel and improved means automatically to insert a sheet into printing position in the recording unit and to eject a sheet therefrom.

More specifically, an object is to provide, in connection with a recording apparatus having a laterally movable carriage, means to prevent feeding or ejecting of a sheet with respect to the recording apparatus unless the carriage is in a predetermined position.

Still more specifically, it is contemplated to provide automatic means to feed a sheet to and eject a sheet from the platen of the recording apparatus and which is operable only when the platen or carriage of the recording apparatus has first been set in a predetermined lateral position.

Another object is to provide sheet squaring means within the feed section of the machine to square and definitely locate the sheet prior to its insertion into the recording apparatus.

It is also an object to provide automatic means, acting alternatively to the manual means, for operating the ordinary feed release mechanism of a typewriter.

It is an object, further, to associate with the ordinary feed release operating mechanism, stop means for arresting the sheet in a definite location and to square the sheet before it is automatically fed around the platen to writing position.

Still another object is to provide elements spaced to permit only one sheet at a time to pass therethrough from a supply stack to feeding apparatus and the spacing of which may be varied in accordance with the thickness of sheet being handled.

It is contemplated, further, to provide impositive means for rotating a sheet feeding element to enable it to slip while the leading edge of the sheet is engaged with sheet locating means.

It is also an object to provide stop means in a cyclically operating machine for arresting a sheet and which automatically moves, as soon as the lagging edge of one sheet passes, into arresting position to arrest the next sheet to prevent advance of the latter until the next cycle of machine operations.

Another object is, also, to provide feed rolls for the sheet normally out of coaction and placed in coaction automatically during predetermined periods of a cycle.

Another purpose of the invention is to provide novel means to feed a sheet automatically from a supply stack to a predetermined head-spaced position around the platen of a writing machine.

It is further proposed to provide cyclic means for causing two spaced periods of rotation of the platen during one cycle; the first period to eject the sheet previously operated on by the writing machine, and the second to bring a new sheet to writing position on the platen.

It is a still further object of the invention to provide feeding means for coacting with the platen above the printing line and to remove this feeding means automatically during the interval in which a sheet is being brought to writing position around the platen, in order to enable the leading edge of this sheet to pass freely into position between the feed means and the platen.

It is further proposed that a sheet guide be associated with the feed means above the printing line and which is to be moved, along with the feed means, to remote position from a coacting guide in order to facilitate entrance of the leading edge of a sheet between the coacting guides.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a front view of the machine with the casing of the feeding and ejecting unit removed.

Figs. 2 and 3 are sections, respectively, on lines 2—2 and 3—3 of Fig. 1.

Fig. 11 is a side view of the means for bringing the eject rolls of the feeding and ejecting unit into play.

Fig. 12 is a side, sectional view of the separator rolls and the adjacent, front portion of the envelope supply hopper.

Figure 1:
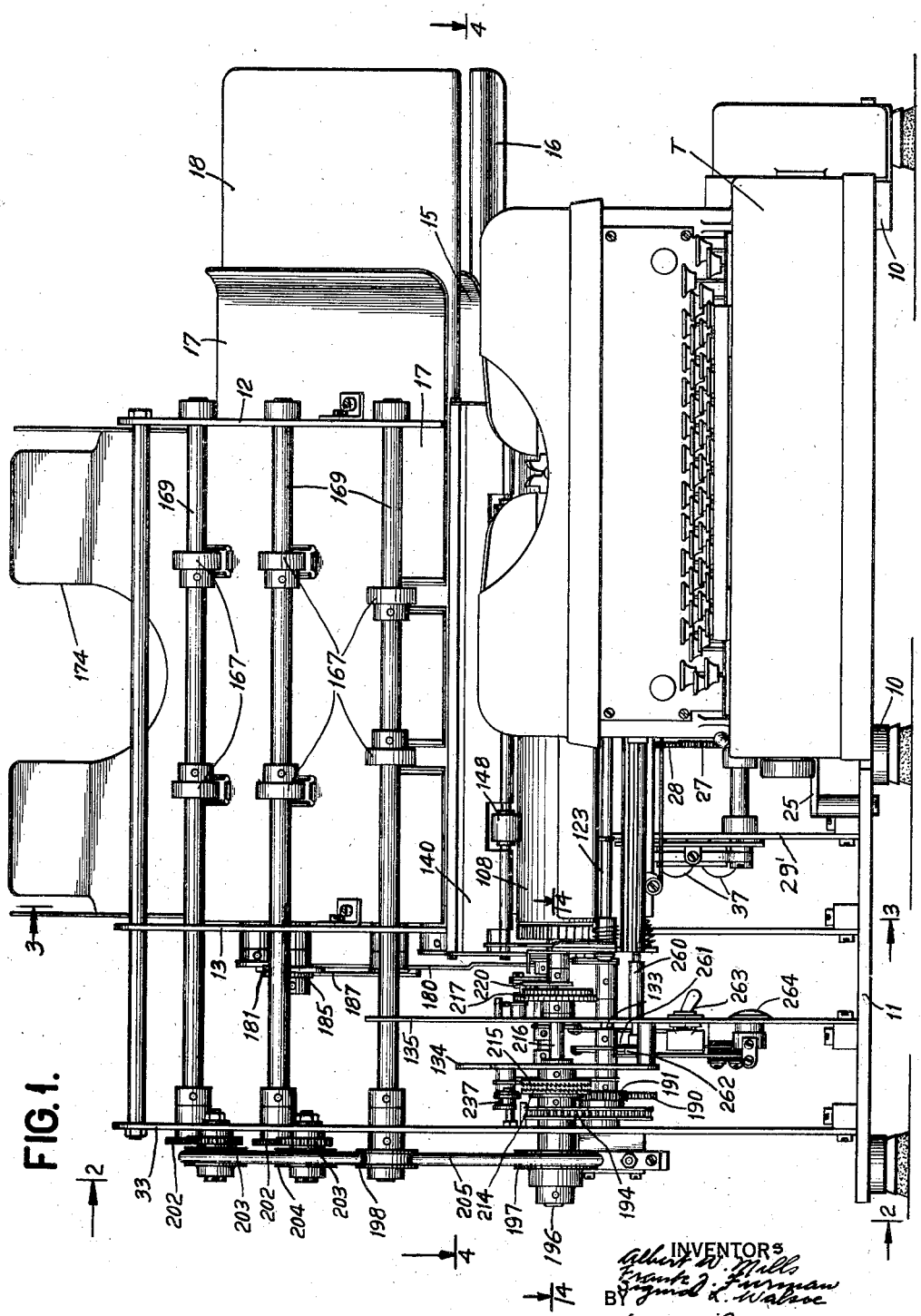

The machine comprises bars 10 supporting the base plate 11 (Figs. 1 and 2) of the feeding section. The bars 10 extend forwardly beyond the base plate to support a typewriter unit T to which the work is fed by the feeding section. Mounted on plate 11 are the main side frames 12 and 13, to each of which is fastened a vertical extension plate 14. Secured to and straddling the side frames in front of extension plates 14 are spaced guide plates 15 and 16 of a lower guiding assembly (also see Figs. 3, 12, and 13). Above the lower guiding assembly, an upper guiding assembly comprising guide plates 17 and 18 (also see Fig. 11) is secured to and straddles the side frames. The guide plates extend past the side frame 12 in order to support the work while being moved laterally by the typewriter carriage.

The machine may be used to feed either envelopes, sheets, or other similar work, to the typewriter, a supply hopper 19 (Figs. 3 and 4) being used for the sheets and a supply hopper 20 (Fig. 12) for the envelopes. The term "sheet" may be used hereinafter to refer either to sheets, envelopes, or the like. To the bottom of each hopper are secured angle pieces 22, the vertical legs of which are bifurcated to seat on studs 23 projecting from frame extension 14. Either hopper, when in operative position, has its angle pieces 22 seated on studs 23 and its front end resting freely on the adjacent end of the lower guide plate 15 of the lower guiding assembly.

The drive for the feeding means comprises a motor M (Figs. 2, 3, and 4) mounted on a stand 25 supported by the base plate 11. On the stand is a gear reduction unit (not shown) enclosed in a box 26, and through which the motor rotates a gear 27 (see Figs. 1, 3, and 4) which, through a gear 28, rotates a shaft 29 journaled between side frame 12 and a vertical standard 29'. One end of shaft 29 rigidly carries a toothed clutch disk 30 (particularly refer to Fig. 3), adjacent which is a clutch arm 31 fixed to a cam shaft 32 alined with shaft 29 and journaled between side frame 13 and an outer standard 33. Arm 31 carries a clutch dog 34 adapted to engage the clutch disk 30. The clutch dog is held disengaged from the clutch disk by the nose of a latch arm 35. The nose of arm 35 is simultaneously engaged with the free end of clutch arm 31 so as to hold cam shaft 32 in home position. Pivoted to the latch arm 35 is a rebound pawl 35' engaged with the tail of the clutch dog, and also with the free end of arm 31 so as to prevent rebound of the clutch dog and the cam shaft. Latch arm 35 is rigid with armature 36 of a clutch magnet 37. When the magnet is energized, in a manner which will be explained later, the nose of latch arm 35 is withdrawn from the clutch dog 34 and the clutch arm 31, permitting the clutch dog to engage clutch disk 30 to couple the cam shaft 32 to shaft 29. When magnet 37 is deenergized, latch arm 35 returns to position for intercepting the clutch dog to uncouple the cam shaft 32 from the drive shaft 29 and for intercepting the free end of the clutch arm 31 to arrest the cam shaft in home position.

Figure 3:
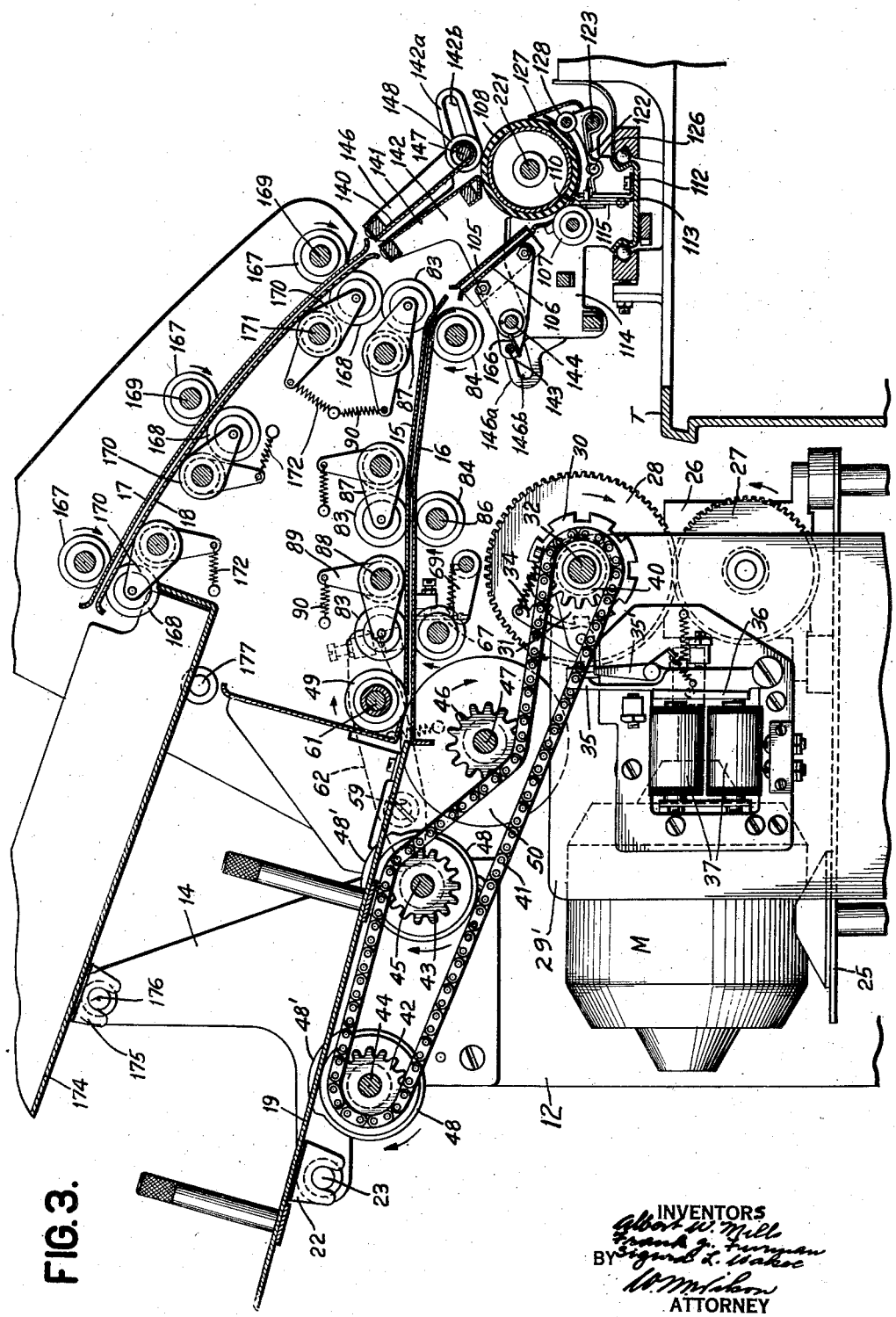

Cam shaft 32 is provided with a sprocket 40 which, through a chain 41, drives sprockets 42 and 43 of shafts 44 and 45 located below the supply hopper. As indicated in Fig. 3, the chain 41 passes around a guide sprocket 46 which runs free on a shaft 47.

Shafts 44 and 45 carry feed rollers 48, each formed with a rubber rim, a portion of which is enlarged to provide a feed sector or cam 48'. During rotation of the shafts 44 and 45, the feed sectors 48' move through suitable openings in the bottom of the supply hopper to engage the bottom sheet to frictionally advance the sheet through the mouth of the hopper and towards a pair of separator rolls 49 and 50. The friction between the bottom sheet and the sheets above is sufficient to cause several of the sheets to feed through the mouth of the hopper, but the spacing of the separator rolls and their action, which will be explained further on, are such as to permit only the bottom one of the sheets or envelopes to pass between the separator rolls and into the lower guiding assembly 15 and 16.

The lower separator roll 50 is considerably larger than the upper separator roll 49, and while both are provided with rubber surfaces, the surface of the lower roll is rougher. Due to the larger diameter and rougher surface of the lower separator roll, the latter acts more positively than the upper separator roll on the sheets fed thereto. The lower separator roll is carried by a sleeve 51 (Fig. 4) rotatably mounted on the shaft 47 and provided at opposite sides with friction clutch disks 51', one of which is engaged with a friction clutch face 52' of a collar 52 fixed to the shaft. The other disk 51' is engaged with a friction disk 53, the hub of which is slidably keyed to shaft 47. A coil spring 54 between a collar 55, fixed to shaft 47, and the hub of disk 53 urges the latter axially against the adjacent friction disk 51'. The lower separator roll 50 is thus frictionally driven by shaft 47, the friction being light enough to permit the lower separator roll to slip when the sheet engaged therewith is arrested.

Figure 13:
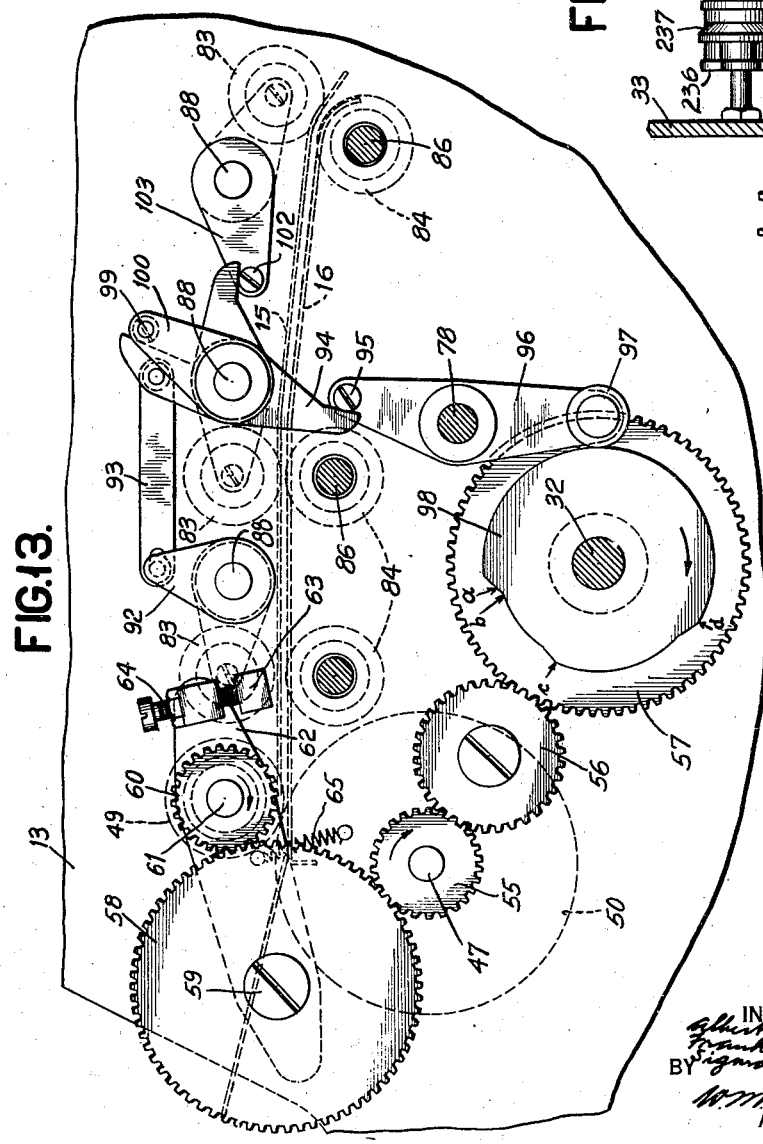
Fig. 13 is a side view of the means for rotating the separator rolls and the means for bringing the feed rolls into play.

Shaft 47 of the lower separator roll is provided outside the side frame 13 with a pinion 55 (Fig. 13) rigid with a pinion 55' of the same size (see Fig. 4) which is driven, through a gear 56, from a gear 57 secured to cam shaft 32. Pinion 55 meshes with a gear 58 on a stub shaft 59 carried by a side plate 13. A similar stub shaft 59 is carried by the other side frame 12. Gear 58 meshes with a pinion 60 on the shaft 61 of upper separator roll 49. It is evident that the gearing between the separator rolls effects their rotation in the same, clockwise direction (Fig. 13). Shaft 61 of the upper separator roll passes with considerable clearance through holes 61' (see Fig. 12) in the main side frames 12 and 13, and is journaled on arms 62 rockably mounted on the stub shafts 59. The side frames 12 and 13 are provided with stop lugs 63 for engagement with screws 64 adjustably carried by the free ends of arms 62. Springs 65 connected to the arms urge the arms downwardly to maintain screws 64 engaged with stop lugs 63.

When the hopper 19 for the sheets is in position, the upper separator roll shaft 61 is in lower position (Fig. 13) with screws 64 engaged with stop lugs 63 and with the upper separator roll 49 spaced from the lower separator roll a distance substantially equal to the thickness of one letter sheet. When it is desired to feed envelopes to the typewriter, tray 19 is removed and the envelope tray 20 (Fig. 12) inserted in position. The envelope tray is provided with hooks 66 which, as the envelope tray is set in position, are slipped under the shaft 61 of the upper separator roll, thereby lifting the latter against resistance of springs 65 so as to provide a greater spacing between the separator rolls corresponding to the greater thickness of the envelope. As the upper separator roll is raised, the arms 62 rock counterclockwise (Fig. 12) about the stub shafts 59, so that the pinion 60 of the upper separator roll shaft 61 rolls on the gear 58 to remain properly meshed therewith.

During a revolution of cam shaft 31, feed portions 48' of rolls 48 advance several sheets through the mouth of the hopper and to the separator rolls. The lower separator roll 50 rotates in a direction to continue the feed of the sheets, while the upper separator roll 49 rotates in a direction to return the sheets towards the hopper. The lower roller, being rougher and larger than the upper separator roll, its feeding action is more positive and results in the bottom sheet or envelope being advanced between and past the separator rolls, while the other sheets are held back by the action thereon of the upper separator roll. The bottom sheet is advanced by the lower separator roll until its leading edge strikes a stop plate 67 (Figs. 3, 4, 9, and 10) which, at this point of the cycle, extends completely across the space between the upper and lower guide plates 15 and 16 of the lower guiding assembly. Since the lower separator roll is frictionally driven, it is permitted to slip when retarded by frictional engagement with the now-arrested bottom sheet. The purpose of stops 67 is to locate and aline the leading edge of the sheet accurately for its subsequent feed to the typewriter.

Figure 9:
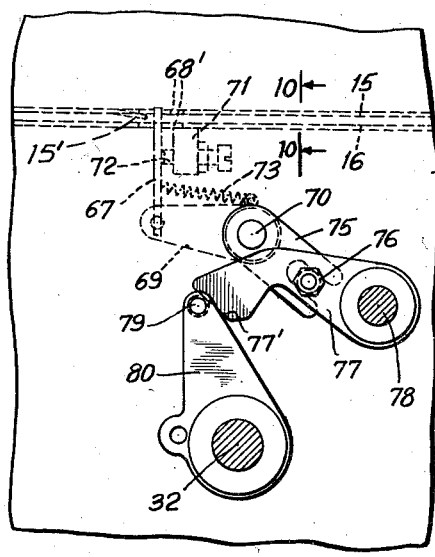
Fig. 9 is a side, detail view of the means for operating the sheet squaring and arresting means located within the feeding section of the feeding and ejecting unit.
Figure 10:
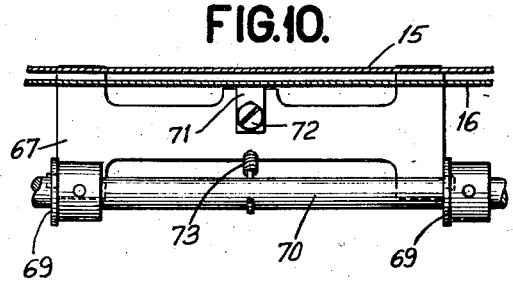
Fig. 10 is a section along lines 10—10 of Fig. 9.

Stop plate 67 projects through lateral extensions 68' of openings 68 in the upper and lower guide plates 15 and 16 of the lower winding assembly. The stop plate is pivotally carried by arms 69 fixed to a shaft 70. To the bottom of the lower guide plate 16 is fixed a lug 71 which adjustably carries a stop screw 72 and against which the stop plate 67 is held by a spring 73. In order to prevent curling of the leading edge of the sheet when it strikes the stop plate, the upper guide plate is bent downwardly along openings 68' to form lips 15' (Fig. 9) which narrow the guide passage in front of the stop plate. The screw 72 is adjusted to position the stop plate closely adjacent the front edges of the lips 15'. The shaft 70 is rigidly provided with a crank arm 75 forked to receive a stud 76 carried by an intermediate portion of an arm 77, rotatably carried by a rod 78 fixed between side frames 13 and 33. The free end of arm 77 is formed as a cam edge 77' which engages a pin 79 on an arm 80 secured to cam shaft 32. During the cycle of shaft 32, the arm 80 moves clockwise and its pin 79 cams against the edge 77', causing arm 77 to rock clockwise (Fig. 9). The clockwise movement of arm 77 rocks the arm 75 and its shaft 70 counterclockwise. The arms 69 of shaft 70 thereupon move downwardly to lower stop plate 67 out of the passage between the guide plates 15 and 16. When the stud 79 of arm 80 passes the edge 77' of arm 77, a light spring 81 connected to an arm 82 fixed to the right hand end of shaft 70 (see Fig. 4) returns the stop plate mechanism to its normal condition, with the stop plate 67 in upper position, across the passage between the guide plates 15 and 16.

When the stop plate 67 is lowered to permit the sheet to pass, the sheet is advanced by the lower separator roll 50 and by three successive pairs of upper and lower feed rolls 83 and 84 (Figs. 3, 4, 12, and 13). The lower feed rolls 84 are carried by shafts 86 which rotate continuously during the cycle, while the upper feed rolls 83 are rotatably carried by the yokes 87 secured to shaft 88. Each shaft 88, at the end adjacent side frame 12, has an arm 89 connected to a spring 90 which urges the shaft in a direction to lower the upper feed rolls into feeding engagement with the lower feed rolls.

Initially, however, the upper feed rolls are maintained in upper ineffective positions spaced apart from the lower feed rolls, with the rear or left hand set of feed rolls spaced about twice as far apart as the front two sets of feed rolls. Outside the frame 13, the rear shaft 88 has an arm 92 connected by a link 93 to the upper, vertical arm of a triple-arm lever 94 which is rotatably mounted on the second shaft 88. The lower, vertical arm of lever 94 abuts a stud 95 at the upper end of a lever 96 rotatably carried by rod 78 and provided at its lower end with a cam follower roller 97 engaged with a cam 98 on shaft 32. The upper arm of lever 94 abuts a pin 99 projecting from an arm 100 fixed to the second shaft 88. The horizontally extending arm of lever 94 engages a stud 102 on an arm 103 fixed to the third or front shaft 88.

At the beginning of a cycle, all of the upper feed rolls are in upper, inactive position. After the stop plate is withdrawn from the feed passage, the cam 98 permits clockwise movement of lever 96 (Fig. 13). The springs 90 of the upper feed roll structures then becomes effective to rock the shafts 88 in directions to lower the feed rolls 83 into operating positions with respect to the companion feed rolls 84. The rear feed rolls 83, being initially spaced further from the companion feed rolls than the upper feed rolls of the front sets are from their companion rolls, it takes longer for the feed rolls 83 of the rear set to engage than for the feed rolls 83 of the front sets. Thus, the front feed rolls engage at about 115° of the cycle at point a (Fig. 13), while the rear feed rolls engage at about 122° at point b (see also Fig. 16). After the front pairs of feed rolls become engaged, the rear feed roll structure continues to move to bring the rear feed rolls into engagement and, during this continued movement, link 93 acts on lever 94 to rock the lever further counterclockwise, with the result that when the rear feed rolls have finally engaged, the upper vertical arm of lever 94 will be at a clearance distance from the pin 99 of arm 100 of the second shaft 88, and the horizontal arm 101 of lever 94 will be at a clearance distance from the stud 102 of arm 103 of the first shaft 88. The follower 97 of lever 96 then dwells until about 145°, at which point a rise begins and causes counterclockwise rocking of lever 96 which, acting through the lever 94 and link 93, effects disengagement of the rear feed rolls. This disengagement is completed at about 160° at point c (see Fig. 13). The two front sets of feed rolls, however, remain engaged because, during the rise of follower 97 to point c, the lever 94 is rocked only enough to disengage the rear feed rolls and take up the clearance btween the pins 99 and 102 and the associated arms of lever 94. The follower 97 then dwells and the two front sets of feed rolls remain engaged until about 233°, at which point a further rise begins which causes rocking of lever 96 counterclockwise to a further extent and corresponding clockwise rocking of lever 94. This results in the disengagement of the two front sets of feed rolls at about 248° at point d (Fig. 13).

The lower feed rolls 84 are continuously rotated during the cycle by means to be described later, and when the upper feed rolls are moved down, the coaction of the feed rolls effects feed of the sheet to advance it from the stop plate 67, which has meanwhile been lowered to permit the leading end of the sheet to pass. The feed rolls continue to feed the sheet along the passage between the upper and lower guide plates 15 and 16, out of the front, exit end of the latter passage, and into the passage between upper and lower guide plates 105 and 106 (Figs. 3 and 8) of a lower guide assembly provided on the typewriter carriage.

Figure 6:
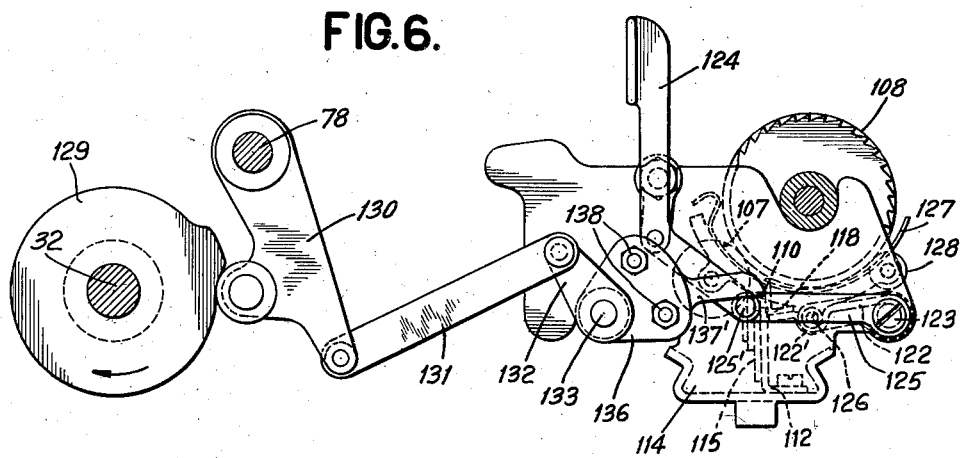
Fig. 6 is a detail view of the automatic means for operating the release shaft of the typewriter.
Figure 7:
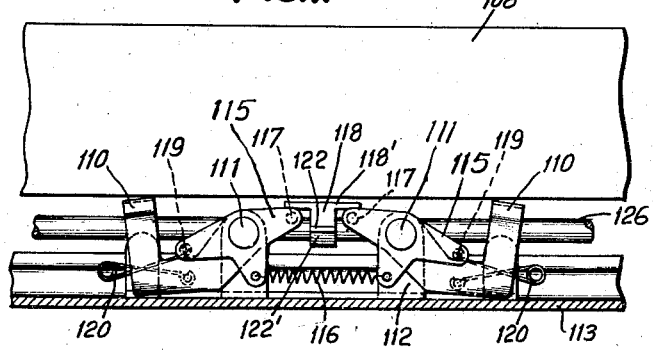
Fig. 7 is a front, detail view of the sheet squaring and arresting means provided within the typewriter unit.

The front sets of feed rolls 83—84 continue to feed the sheet along guide means 105—106 and into position between the lower pressure rolls 107 and the platen 108 of the typewriter and until the leading edge of the sheet strikes a pair of alined stops 110 (Figs. 3, 6, and 7). These stops are pivotally mounted on studs 111 carried by a bracket plate 112 secured to the base plate 113 of the typewriter carriage frame 114. Also pivotally mounted on the studs 111 are two triple arm levers 115, one associated with each stop 110. A coil spring 116 connecting the vertical arms of levers 115 urges the levers to rock in opposite directions to maintain the pins 117 of the adjacent horizontal arms of these levers against the bottom of the head 118' of a T-shaped member 118. Between pins 119 on the opposite horizontal arms of levers 115 and the associated stops 110 are wire springs 120 which compel the stops to rock about studs 111 in the same directions as and to follow the associated levers. The leg of the T member 118 is secured to an arm 122 fixed to the ordinary release shaft 123 journaled in the side plates of the carriage frame 114, and which may be manually operated by the usual manual release lever 124 connected by a pin 125' to an outside arm 125 fast to the left end of the release shaft. Arm 122 has a depression 122' which cradles the rod 126 supporting the curved guide shield 127 which carries the rear pressure rolls 107 and the front pressure rolls 128 adapted to coact with platen 108. When these pressure rolls and guide shield 127 are in upper, operative coaction with respect to the platen, the T member 118 is also in upper position, thereby allowing spring 116 to effectively rock the levers 115 in directions to lower the pins 119 which, through springs 120, lower both stops 110 out of the path of the sheet.

When release shaft 123 is rocked counterclockwise (Figs. 3 and 6), the rod 126 and the guide shield 127 together with pressure rolls 107 and 128 move downwardly, away from the platen 108, to permit the sheet to move freely into position between the platen and the guide shield with its pressure rolls. As the arm 122 is rocked downwardly, the T member 118 secured thereto acts on the studs 117 of levers 115 to rock these levers in directions to move the pins 119 upwardly. As a result, the wire springs 120 become effective to rock the stop arms 110 upwardly, through suitable openings in shield 128, into the path of the sheet being fed thereto by the front sets of feed rolls 83 and 84.

The automatic operation of release shaft 123 is controlled by a cam 129 (see Figs. 4 and 6) coacting with a follower lever 130, connected by a link 131 to an arm 132 fixed to a shaft 133 which is journaled by intermediate frame plates 134 and 135. Also fixed to shaft 133 is a sector plate 136 flat against another sector plate 137 (Fig. 4) rotatable on the shaft. The sector plates 136 and 137 are clamped together by threaded fastenings 138 which pass with clearance through holes in sector plate 137 and fit closely within holes of sector plate 136. By loosening the fastenings 138, the sector plate 137 may be adjusted, with respect to plate 136, about shaft 133, and tightening of the fastenings retains the sector plate 137 in adjusted position. Sector plate 137 has an extension arm 137' engaged with the pin 125' carried by the free end of arm 125 of release shaft 123.

During the cycle of shaft 32, cam 129 rocks follower lever 130 counterclockwise (Fig. 6) which, through link 131 and arm 132, causes clockwise action of shaft 133 and, consequently, of sector plates 136 and 137. Extension arm 137' thereupon acts on stud 125' of arm 125 to rock the release shaft 123 and its arm 122 counterclockwise. As arm 122 moves in this direction, it lowers the T member 118 to rock the levers 115 in directions to permit springs 120 to raise the stops 110 into sheet stopping position. At the same time, the lowering of arm 122 causes pressure rolls 107 and 128 and guide shield 127 to move downwardly, away from the platen. The leading edge of the sheet is arrested and alined by the stops 110 at a definite point of its travel around the typewriter platen. The stops 110 remain in operative position for a brief interval at the end of which the cam 129 permits the operating mechanism of release shaft 123 to return to normal position, causing the stops 110 to be lowered out of the path of the sheet and simultaneously causing the shield 127 and pressure rolls 107 and 128 to move upwardly into operative coaction with the platen 108. The adjustment of sector plate 137 about shaft 133 adjusts the timing of the operation of stops 110, the pressure rolls 107 and 128, and guide shield 127.

After the stops 110 are lowered, the platen 108 is automatically rotated, by means described hereinafter, and by coaction with pressure rolls 107 and 128 continues the feed of the sheet around the platen.

Figure 4:
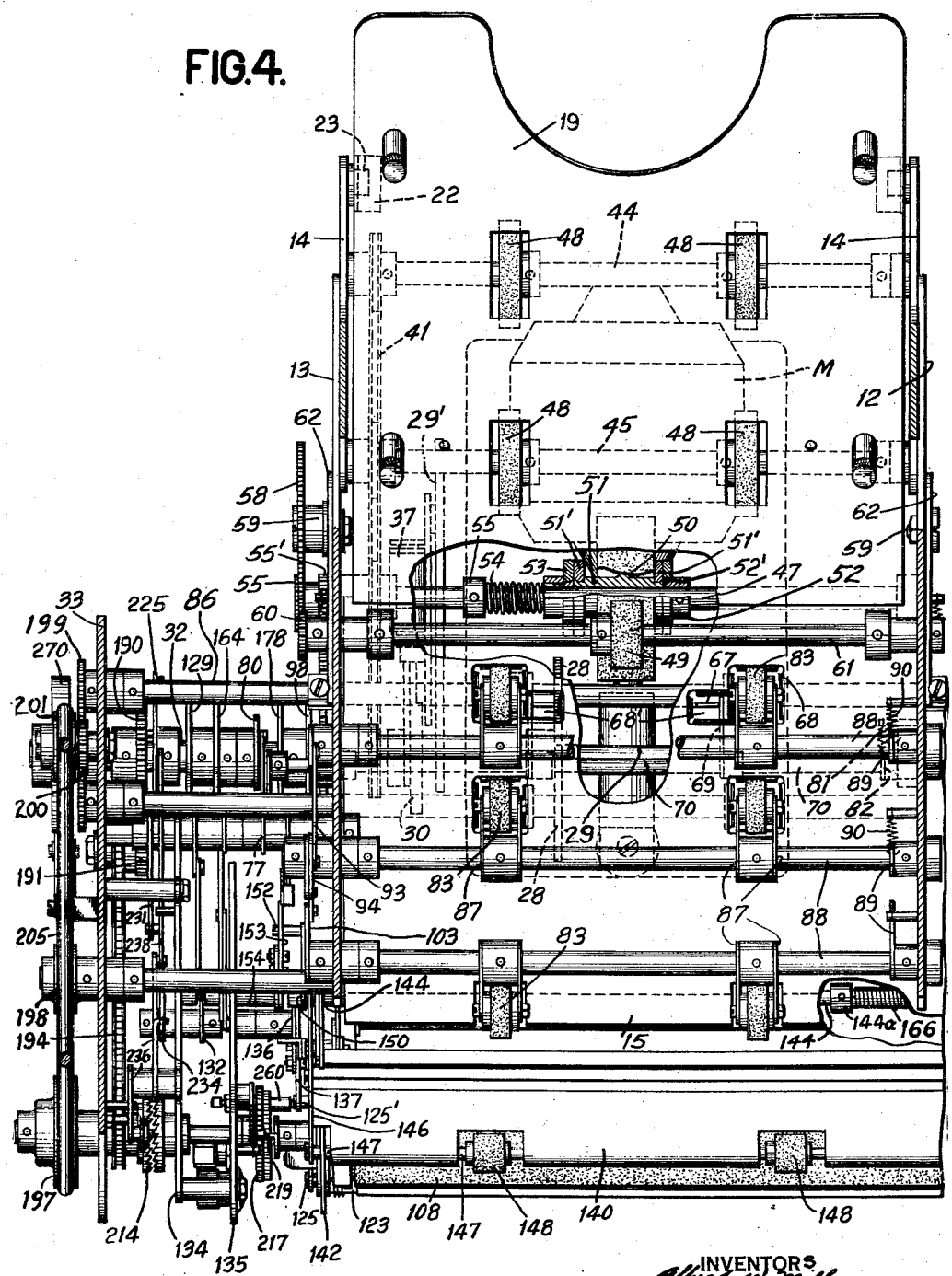
Fig. 4 is a section along lines 4—4 of Fig. 1, with surface parts broken away to show interior mechanism more clearly.
Figure 8:
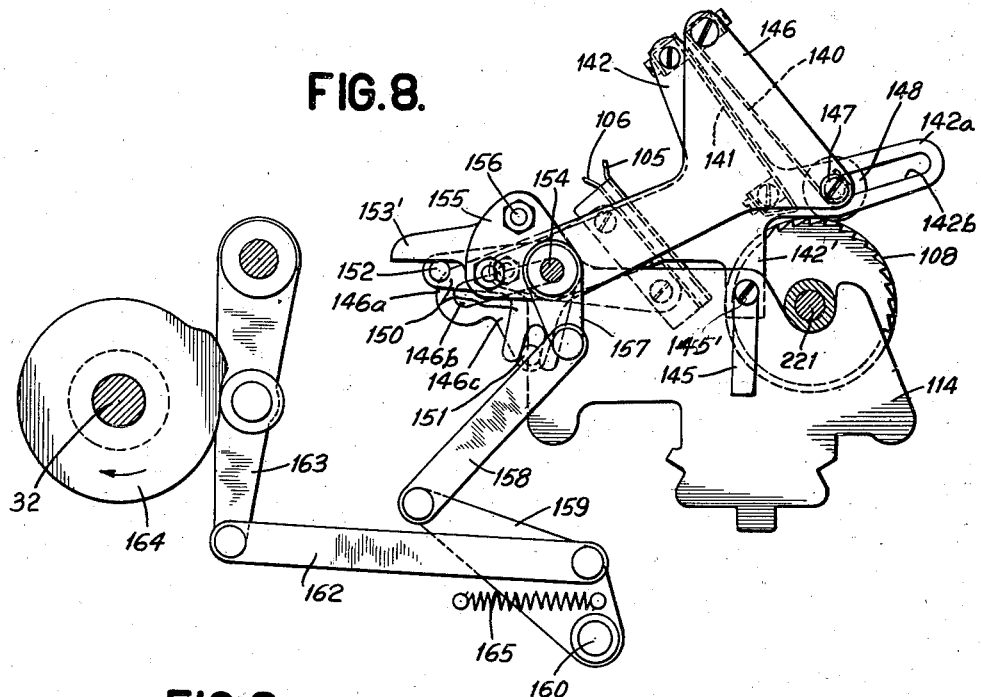
Fig. 8 is a side, detail view of the means for effecting movement of the platen bail.

The platen feeds the work to guide means comprising upper and lower bails, respectively including upper and lower guide plates 140 and 141 (see Figs. 3, 4, and 8). The lower bail comprises side plates 142 bridged and connected by the lower guide plate 141. A spacer rod 143 (Fig. 3) connects the rear portions of the side plates 142. These side plates are rotatably carried by a shaft 144 journaled in the sides of the carriage frame 114. Dependent portions 142' of the side plates are formed with openings to coact with the heads 145' of spring clips 145 carried by the sides of the carriage frame, so as to hold the lower bail normally stationary. The side plates 142 are also formed with forwardly extending arms 142a provided with elongated slots 142b.

The upper bail comprises side plates 146 bridged at the front by the upper guide plate 40. Secured to the side plates 146 is a front cross rod 147 carrying upper pressure rolls 148 for coacting with the platen. The ends of rod 147 extend through the slots 142b of the extensions 142a of side plates 142 of the lower bail. Rearward extensions 146a of sides 146 of the upper bail are formed with elongated slots 146b through which the ends of shaft 144 freely pass. By coaction of the ends of rod 147 with slots 142b of side plates 142 and by coaction of the slots 146b of side plates 146 with the shaft 144, the upper bail is mounted for slidable movement in a slightly inclined direction.

When spring clips 145 are retracted from dependent portions 142' of the lower guide bail, the entire guide assembly, which includes the upper and lower guide bails, is free to be swung rearwardly about shaft 144 in order to permit the platen 108 to be removed or inserted.

The slidable mounting of the upper bail enables the pressure rolls 148 to be moved forwardly, and clear of the platen 108, and the upper guide plate 140 to be moved further away from the lower guide plate 141. The positioning of pressure rolls 148 forwardly and clear of the platen and the increased separation of the guide plates 140 and 141 insure that the work, as it is fed by the rotation of the platen, will move freely behind the pressure rolls 148 and then between the guide plates 140 and 141. The means to actuate the upper bail comprises a bell crank lever 150 (see Fig. 8) fixed to the left end (as viewed in Fig. 4) of the shaft 144. The vertical arm of lever 150 is forked to engage with a stud 151 extending laterally from the rear, dependent extension 146c of the left side plate 146. A similar arm (not shown) is provided at the opposite end of shaft 144 to engage with a stud such as 151 on the right side plate 146. The horizontal arm of bell crank lever 150 is provided with a pin 152 engaged with an arm 153' of a rocker plate 153 rotatable on a shaft 154 journaled by intermediate frame plates 134 and 135 (see Fig. 4) and which is alined with shaft 144. Shaft 154 rigidly carries a sector 155 to which fastenings 156 adjustably clamp the rocker plate 153 in the same manner as the previously described sector plates 136 and 137 of the release mechanism are clamped together. Rigidly carried by shaft 154 is an arm 157 connected by a link 158 to a lever 159 pivoted on a stud 160 extending from the intermediate frame plate 135. Lever 159 is connected by a link 162 to the follower lever 163 of a cam 164 on cam shaft 32. A spring 165 connected to lever 159 forces the follower 163 to remain engaged with the cam 164. During the cycle of cam shaft 32, cam 164 acts on follower 163 to cause clockwise movement of lever 159 and counterclockwise movement of shaft 154. As shaft 154 rocks counterclockwise, the arm 153' acts on the stud 152 of bell crank 150 to rock the bell crank lever and its shaft 144 counterclockwise. The forked arms of shaft 144 thereupon coact with studs 151 of side plates 146 to move the upper bail forwardly or to the right, as viewed in Fig. 8. As a result, the pressure rolls 148 are moved forwardly of and clear of the platen 108 and the upper guide plate 140 is spaced further away from the lower guide plate 141. This action is timed to occur just before the leading edge of the work reaches the pressure rolls 148. The platen which has meanwhile continued in automatic rotation now feeds the work behind the pressure rolls 148 and into the passage between the guide plates 140 and 141 until the desired head spacing has been effected. Thereafter, the cam 164 permits the spring 165 to return the operating linkage for shaft 154 to normal position. The shaft 144 is forced to follow and also return to normal position by means of a coil spring 166 (Fig. 4) surrounding the shaft 144 and connected at one end to a collar 144a fixed to the shaft and at the other end abutting the normally stationary spacer rod 134 of the lower bail (see Fig. 3). This spring tends to hold shaft 144 at its clockwise limit and, thereby, to maintain the upper bail in rear position, with pressure rolls 148 engaged with the platen and the guide plate 140 at normal distance from guide plate 141. The adjustment of plate 153 about shaft 154 adjusts the timing of the operation of the upper bail. This bail may be referred to hereinafter as the platen bail to distinguish it from the lower, normally stationary bail.

When the platen bail is moved forwardly, the platen 108 continues to feed the work behind the pressure rolls 148 and into the passage between guide plates 140 and 141 until a predetermined head spacing of the work is effected, whereupon the automatic rotation of the platen ceases and the pressure rolls 148 and guide plate 140 return to normal positions. The typewriter is then operated to type the desired matter on the work and, during the course of this typing, the work is line spaced in the usual manner to continue the feed of the work upwardly along the passage between the guide plates 140 and 141. The line spacing effected during the typing may result in the leading end of a letter sheet being fed out of the passage between guide plates 140 and 141 and into the alined passage between the guide plates 17 and 18 (see Fig. 3) and to such an extent as to bring the forward end of the sheet between the lowest or front set of eject rolls 167 and 168, all of which, during the typing operation, are spaced apart and out of coaction. In some cases, the line spacing occurring during the typing of the work may not result in advancing the leading end of the sheet into the passage between plates 17 and 18 or into position between the front set of eject rolls 167 and 168. In any case, after the typing of a sheet has been completed, the operator initiates a new cycle, in a manner which will be explained later, during the first portion of which the platen is automatically rotated and coacts with pressure rolls 148 to eject the sheet until the leading end thereof is at least between the first set of eject rolls 167 and 168. There are three successive sets of upper and lower eject rolls 167 and 168 (Figs. 1, 3, and 11). The upper eject rolls 167 are fixed to shafts 169 constantly rotated during the cycle, while the lower eject rolls are supported by yokes 170 fixed to shafts 171 and normally urged by springs 172 into operative feeding coaction with the upper eject rolls. Near the beginning of the cycle, the lower eject rolls are brought into coaction with the upper eject rolls to eject the work, on which the typing had been completed, into the receiving tray 174. This receiving tray has forked angle pieces 175 for engaging studs 176 on the extension frame plates 14. Tray 174 is freely removably supported in position by means of these studs 176 and by means of studs 177 extending from the main side frames. The means for bringing the lower eject rolls into operative engagement with the upper eject rolls comprises a cam 178 (Figs. 4 and 11) coacting with a follower lever 179 connected by a link 180 to a plate 181 (also see Fig. 1) rotatably carried by the shaft 171 of the middle set of eject rolls. The plate 181 has an edge 181a engaged with a stud 182 on an arm 183 fixed to the left hand end (as viewed from the front of the machine) of the shaft 171 of the rear set of eject rolls. An edge 181b of plate 181 engages a stud 184 of an arm 185 fixed to the middle shaft 171. The first or lowest eject shaft 171 has an arm 186 connected by a link 187 to the plate 181. When the follower lever 179 is engaged with the high portion of cam 178, the plate 181 is in a position in which it causes the lower eject rolls to be held out of operative coaction with the upper eject rolls. When the follower lever drops off the high point of cam 178, plate 181 is free to rock counterclockwise (Fig. 11). Thereupon the springs 172 become effective to rock the shafts 171 in directions to move the lower eject rolls upwardly into feeding coaction with the upper eject rolls.

Figure 2:
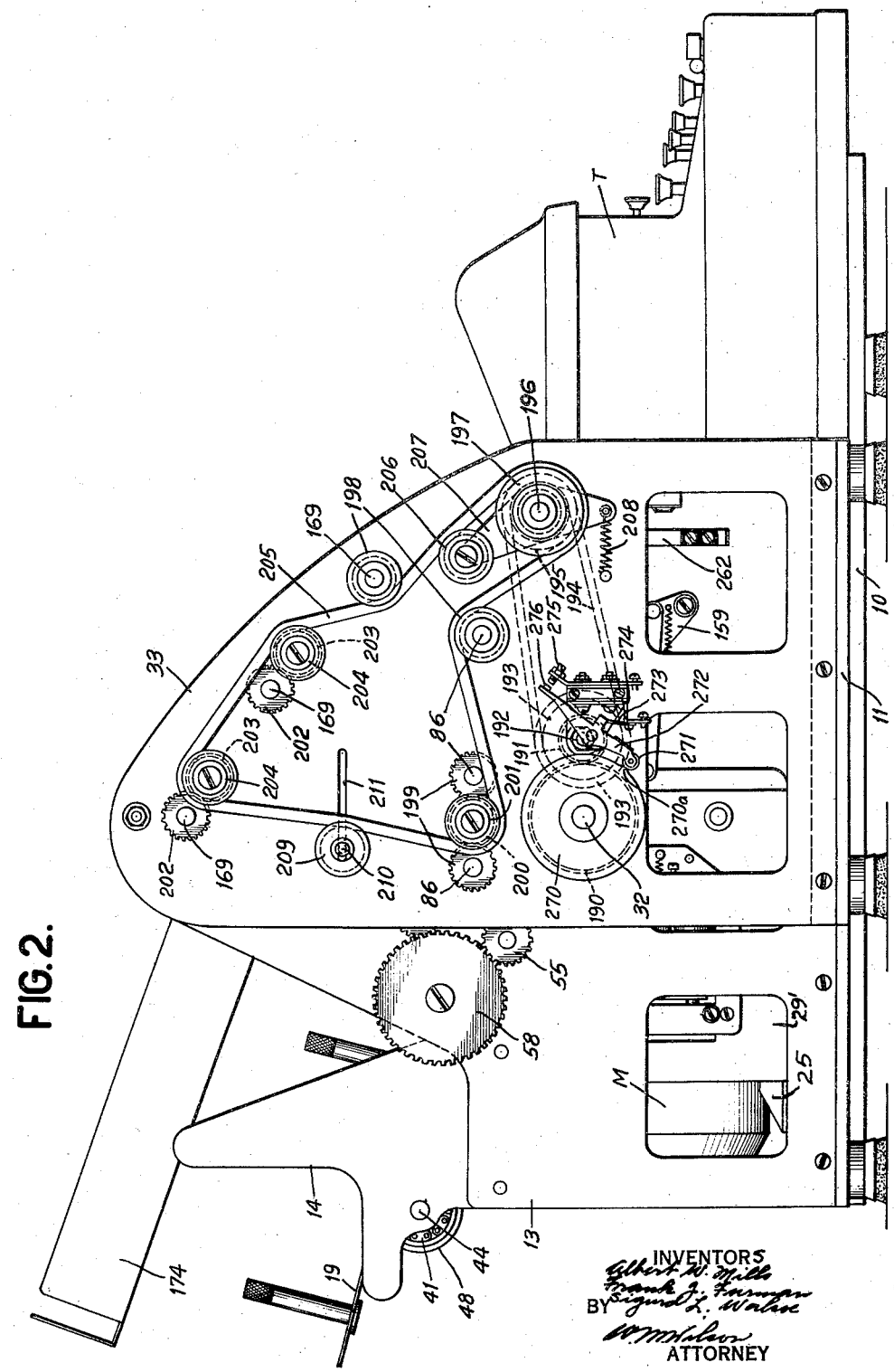

The means for effecting rotation of the lower feed rolls 84 and the upper eject rolls 167 will now be explained. Carried by the cam shaft 32 is a gear 190 meshed with a gear 191 rotatably mounted on a stub shaft 192 carried by the side frame plate 33 (see Figs. 1, 2, and 4). Rigid with the gear 191 is a sprocket wheel 193 which, through a chain 194, drives a sprocket wheel 195 on a shaft 196, journaled by frame plates 33 and 134. Outside the frame plate 33, the shaft 196 rigidly carries a pulley wheel 197. The shafts 86 and 169, respectively of the feed rolls 84 and eject rolls 167, extend past the left hand frame plate 33. Referring to Fig. 2, the front shafts 86 and 169 (nearest the typewriter) are provided outside frame plate 33 with pulley wheels 198. The left ends of the first two feed roll shafts 86 are provided with pinions 199 meshed with opposite sides of a pinion 200 rigid with a pulley wheel 201 rotatably journaled on the frame plate 33. The left ends of the upper two eject shafts 169 are provided with pinions 202 meshed with pinions 203 rigid with pulley wheels 204 rotatably carried by the frame plate 33. Passing around pulleys 197, 198, 201 and 204 is a belt 205 which communicates rotation of pulley wheel 197 to the other pulley wheels. The belt is tensioned by a wheel 206 carried by a lever 207 rockable on shaft 196 and acted on by a spring 208. Any excess slack in the belt between the two rear pulleys 200 and 203 is taken up by a wheel 209 carried by a stud 210 adjustably settable along a horizontal slot 211 in frame plate 33. Rotation of pulley wheels 198 effects rotation of the front shafts 86 and 169. Rotation of pulley 201 acts through pinions 200 and 199 to rotate the first two feed shafts 86. The pulleys 204, acting through pinions 203 and 202, rotate the upper two eject shafts 169. In this manner, the rotation of the cam shaft, through the chain 194, rotates shaft 196 which, through pulley 197 and belt 205, causes continuous rotation of the lower feed rolls 84 and the upper eject rolls 167 during the entire cycle.

The means for automatically rotating the typewriter platen 108 will now be described.

Figure 14:
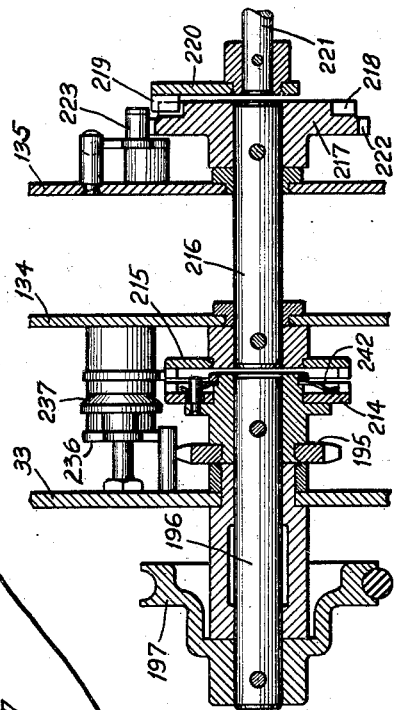
Fig. 14 is a section along lines 14—14 of Fig. 1.

Referring to Fig. 14, shaft 196 carries an axially movable crown clutch disk 214 facing a similar clutch disk 215 on a shaft 216 in alinement with shaft 196 and journaled by intermediate frame plates 134 and 135. At the right of the frame plate 135, shaft 216 rigidly carries a wheel 217 faced with notches 218, adapted for engagement with a tooth 219 projecting from an arm 220 fixed to the left end of shaft 221 of the platen 108, the latter shaft being in line with shaft 216 as well as with shaft 196. The rim of wheel 217 is formed with teeth 222 for coacting with an impositive detent 223 which impositively prevents rotation of shaft 216. During the cycle of cam shaft 32, it acts, as explained before, to effect continuous rotation of shaft 196 and, thereby, of clutch disk 214.

Figure 5:
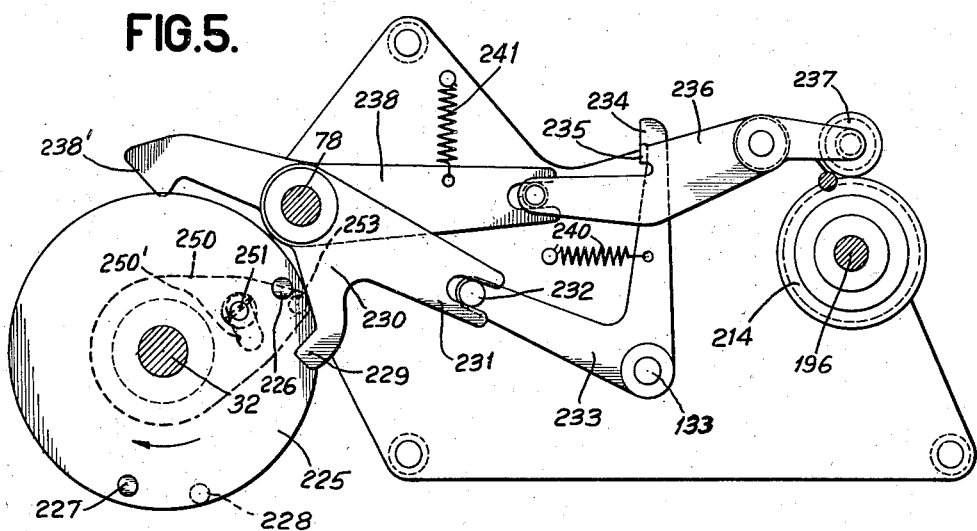
Fig. 5 is a detail view of the platen clutch engaging and disengaging means.

Referring to Fig. 5, cam shaft 32 has a disk 225 provided with studs 226 and 227 extending transversely from one side of the disk and a stud 228 extending transversely from the opposite side of the disk. Near the beginning of the cycle, the first stud 226 cams against the lower end of an arm 229 of a lever 230, rotatably carried by the rod 78, to rock this lever counterclockwise (as viewed in Fig. 5). The arm 231 of lever 230 is bifurcated to engage with a pin 232 on one arm of a bell crank latch lever 233 rotatably mounted on the shaft 133. The vertical arm of lever 233 is formed at the upper end with a latch nose 234 engaged with a transversely bent tab 235 of a lever 236. The forward end of lever 236 carries a beveled disk 237 located above the rim of clutch disk 214 on shaft 196. The rear end of lever 236 has a pin and slot connection with one end of a lever 238 which, at the other end, is formed with a cam edge 238′ adapted to be engaged by the pin 228 of the disk 225 on cam shaft 32.

Near the beginning of the cycle, pin 226 acts on arm 229 to rock lever 230 counterclockwise causing clockwise movement of latch lever 233 against resistance of a spring 240 and, thereby, withdrawing the latch nose 234 from the tab 235 of lever 236. A spring 241 connected to lever 238 thereupon becomes effective to rock the lever 238 counterclockwise (Fig. 5), in turn causing clockwise movement of lever 236. It may be noted that at this point the pin 228 of disk 225 is remote from cam edge 238′ of lever 238 so that it does not interfere with the downward movement of the cam edge 238′. When lever 236 rocks clockwise, the beveled edge of the disk 237 carried thereby engages with the rim of clutch disk 214 to cam this clutch disk to the right (Fig. 14) against resistance of a plate spring 242 (see Fig. 14), thereby engaging clutch disk 214 with clutch disk 215 to couple shafts 215 and 196 for common rotation.

Before initiating the cycle of cam shaft 32, the operator brings the typewriter carriage to the extreme left or to the end-of-the-line position, and leaves the carriage in this position during the entire cycle. At this extreme left-hand limit of the travel of the typewriter carriage, the tooth 219 enters one of the face notches 218 of the wheel 217 rigidly carried by the shaft 216, thus coupling the platen shaft 221 to the shaft 216 before the beginning of and for the duration of the cycle. Hence, during the periods of the cycle when shaft 196, through engaged clutch disks 214 and 215, rotates shaft 216, the latter shaft, through coupling 218—219, rotates the shaft 221 and platen 108. The rotation of the platen 108 now acts to eject the sheet in the typewriter and the typing of which has been completed, moving the sheet further upwardly along the passage between guide plates 140 and 141 and into the passage between guide plates 18 and 19 until the leading portion of the sheet or envelope is located at least between the front set of eject rolls 167 and 168. This eject action of the platen is terminated when the pin 228 on the cam shaft disk 225 moves into coaction with the cam edge 238′ of lever 238, causing lever 238 to rock clockwise, in turn effecting counterclockwise action of lever 236 to raise beveled disk 237 from clutch disk 214. Spring 242 thereupon retracts clutch disk 214 from clutch disk 215, causing rotation of shaft 216, platen shaft 221, and platen 108 to cease. As lever 236 moves counterclockwise, the lug 235 thereof slides down along the front of latch nose 234 of latch lever 233 until it reaches a position below the latching shoulder of the latch nose, whereupon spring 240 rocks the lever 233 counterclockwise to relatch lever 236.

While the platen is rotating to eject the sheet previously typed, the feed rolls 83, 84 are advancing the next sheet along the passage between guide plates 15 and 16 and through the passage between guide plates 105 and 106 until the leading edge of the latter sheet strikes the stops 110. As explained before, this definitely locates the sheet for its subsequent feed by the platen to the predetermined head spaced position. The stops 110 are in arresting position for a brief interval and as they withdraw, pressure rolls 107 and 128 and guide shield 127 return to operative position with respect to plate 108. Shortly thereafter, the platen shaft 221 is again set in rotation. This is effected when the pin 227 of disk 225 rides past the arm 229 of lever 230, causing the engagement of clutch disks 214 and 215, in the same manner as explained before, to couple shaft 216 to shaft 196. The platen shaft 221, which is still coupled to shaft 216, is thus set in rotation for the second time during the same cycle. The second period of rotation of platen 108 advances the sheet towards the pressure rolls 148, which as the leading edge of the sheet is approaching, are moved forward together with upper guide plate 140, in the manner explained before. The leading edge of the sheet then is fed by the platen behind the pressure rolls 148 and into the passage between the guide plates 140 and 141. When the desired, predetermined head spacing has been effected, the platen 108 stops rotating, and the pressure rolls 148 and guide plate 140 return to normal positions. The means for interrupting the rotation of the platen when the desired head spacing has been effected includes a plate 250, rotatably carried by shaft 32 and adjustably provided with an elongated slot 250' through which a screw 251, threaded into a hole in the disk 225, freely passes, to clamp the plate 250 to the disk in a concentrically adjustable position. Plate 250 is provided with a stud 253 extending in the same direction as stud 228 towards the lever 238. After the pin 227 on disk 225 has acted on the lever 230 to unlatch the clutch engaging lever 236, producing the second period of rotation of the platen during the same cycle, the stud 253 strikes the cam edge 238' of lever 238 to cause the lever 236 to return to clutch-disengaging position, in which it is again relatched by lever 233. By adjusting the plate 250, about shaft 32, with respect to disk 225, the point of the cycle at which the stud 253 engages the cam edge 238' may be varied to variably time the end of the second period of rotation of the platen, thereby varying the extent of the automatic head spacing.

Figure 15:
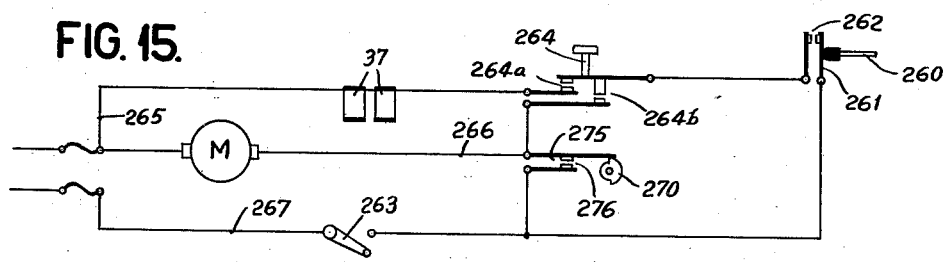
Fig. 15 is a circuit diagram.

During the cycle of cam shaft 32, it is necessary that the typewriter carriage first be moved to its left-hand limit (as viewed in Fig. 1), in which position, as described before, the platen shaft 221 is coupled to shaft 216. In order to prevent initiation of a cycle unless this is first done, the cycle-initiating means includes a pin 260 (Figs. 1 and 4), extending from the left side of carriage frame 114, and which, as the carriage is moved to its left-hand limit, strikes a vertically disposed spring contact blade 261 to close contacts 262 (also see Fig. 2). With contacts 262 closed and the main switch 263 (Fig. 1) turned on, the operator may then initiate a cycle by depressing the push button 264. Referring to the circuit diagram (Fig. 15), with switch 263 closed, the pin 260 of the typewriter carriage holding contacts 262 closed, and with the push button contacts 264a and 264b closed, the following circuit is completed: From the side 265 of the source of current, through the motor M, line 266, push button contacts 264b, carriage operated contacts 262, and through switch 263 to the opposite side 267 of the current source.

The motor M is set in operation by the above circuit. Simultaneously with the formation of the motor circuit, a circuit is established through the clutch magnet 37. The circuit of clutch magnet 37 is from the supply side 265, through the magnet, push button contacts 264a, carriage operated contacts 262 and switch 263 to the opposite supply side 267. In the manner explained before, the energization of magnet 37 couples the cam shaft 32 to the motor-driven shaft 29 for a cycle of operation.

On the extreme left-hand end of the cam shaft 32 is a disk 270 (see Fig. 2) of insulating material which has a single high point 270a, engaged at the beginning of the cycle with a roller 271 carried by the lower end of a lever 272 pivoted to the frame plate 33 and which is urged clockwise (Fig. 2) by a bent spring 273, extending between the lever and a bracket 274. The bracket 274 mounts a stationary but adjustable contact 275 adapted to coact with the companion contact 276 carried by the upper end of lever 272. At the beginning of the cycle, with the high point 270a of disk 270 engaging roller 271 of lever 272, the contact 276 carried by the lever is separated from the contact 275. Directly after the cam shaft 32 starts its cycle, the high point 270a of disk 270 departs from the roller 271 of lever 272 permitting spring 273 to rock the lever clockwise, engaging contact 276 with contact 275. Referring again to the circuit diagram, the closing of these cam contacts 275—276 forms a shunt return path for the motor circuit which bypasses the push button contacts 264b and carriage operated contacts 262 so as to maintain the motor in operation after the operator releases the push button 264. The motor then continues to rotate until cam disk 270, just before the end of the cycle, engages again with the roller 271 to return lever 272 counterclockwise opening the cam contacts 275—276. The operator need hold the push button 264 in only momentarily since, after the cycle starts, the motor circuit is held by the shunt path through cam contacts 275—276. As soon as the operator releases the push button, contacts 264a and b open, causing deenergization of clutch magnet 37 which permits latch lever 35 to return to position for declutching cam shaft 32 from drive shaft 29 at the end of one revolution of the cam shaft.

As stated previously, it is only possible to initiate a cycle when the carriage is at its extreme left-hand limit, in which position the guide means 105—106 and 140—141 thereof are located directly in front of the main side frame 12 and 13 and, respectively, in positions to receive the new sheet from the lower guide plates 15 and 16 and for ejecting the typed sheet into the passage between the guide plates 17 and 18. As soon as the typing starts the carriage spaces to the right, resulting in the opening of contacts 262 so as to prevent initiation of a cycle. During typing, as the carriage travels towards the right, the exit end of the passage between guide plates 140 and 141 moves along the entrance end of the passage between guide plates 17 and 18, so that when the sheet is fed upwardly by vertical spacing operations of the platen, the leading end of the sheet may enter freely between the guide plates 18 and 19, if it has not already done so during the head spacing operation. If a long sheet is being typed on, the lagging portion thereof may extend to the rear of the guide plates 105 and 106 and into the passage between plates 15 and 16. During the travel of the carriage towards the right, the rear and front portions of the sheet may travel freely along the portions of guide plates 16 and 19 extending beyond the side frame 12.

*Summary of operation*

Figure 16:
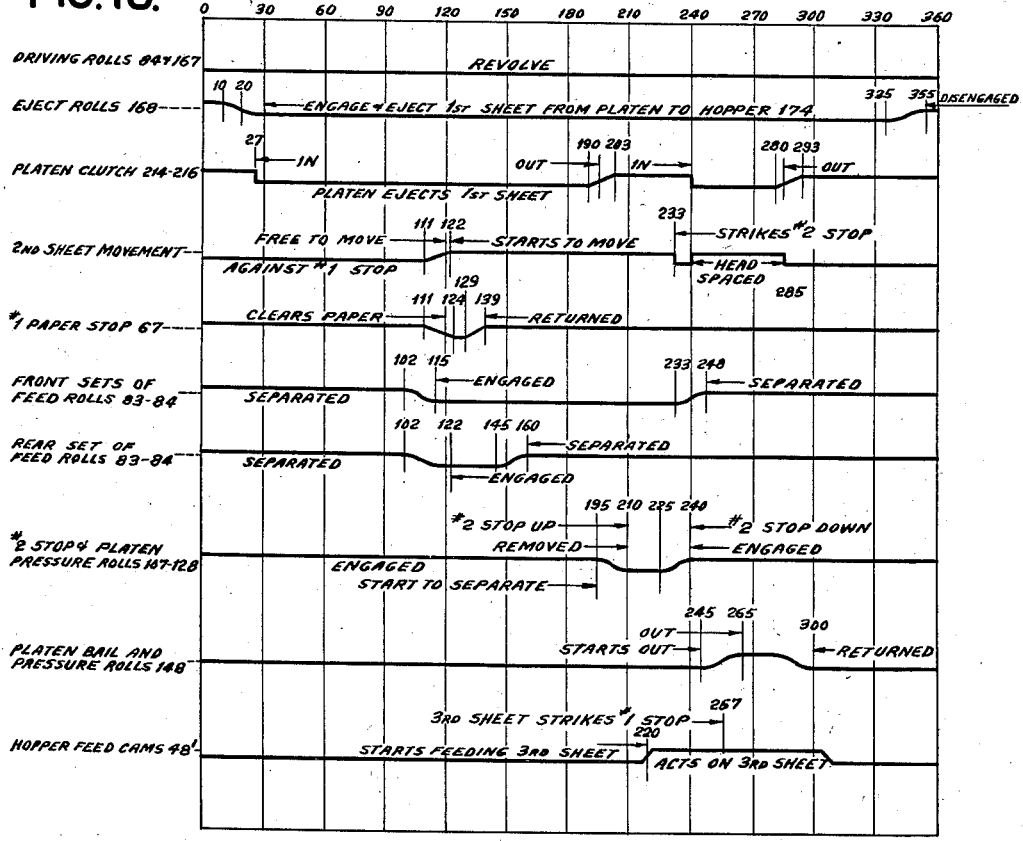
Fig. 16 is a time chart.

A brief summary of the operations will now be given with particular reference to the time chart (Fig. 16).

When it is desired to feed envelopes, then the envelope tray 20 (Fig. 12) is used, and when it is desired to feed flat sheets such as letter sheets, then the tray 19 (Fig. 3) is used. It should be noted that the envelopes are stacked in the tray 20 with their flaps facing upwardly and directed towards the mouth of the hopper. Whether dealing with envelopes, letter sheets, or similar work, the leading edges thereof occupy the same positions at the same points of the cycles so that the following description applies either to envelopes, letter sheets, or the like.

In order to make the description clearer, three sheets will be considered, of which the first sheet is assumed to have been previously fed to the typewriter and its typing completed, of which the second sheet is assumed to have been fed out of the hopper with its leading edge against the #1 stop 67, and of which the third sheet is the bottom sheet in the hopper. Having brought the typewriter carriage to the extreme left (Figs. 1 and 4) to cause pin 260 to close contacts 262, the operator momentarily depresses the push button 264 to close push button contacts 264a and 264b. As a result the clutch magnet 37 is energized and the motor M set in operation. Cam shaft 32 now goes through a cycle. The first thing that occurs during the cycle is the movement of the lower eject rolls 168 (see Fig. 11) upwardly into coaction with the eject rolls 167; this occurs at about 20° of the cycle. Shortly thereafter, at 27° of the cycle, the platen clutch 214—216 (see Fig. 14) is engaged under control of the pin 226 on the disc 225 of cam shaft 32 (see Fig. 5). The platen now starts rotating and ejects the first sheet, on which the typing has been completed, entirely from the platen to the eject rolls, which complete the ejection of this sheet to the storage hopper 174. At 120° of the cycle, the second sheet, which has its leading edge against the #1 stop, is free to advance forwardly as a result of the lowering of this stop. At 122°, the rear set of feed rolls 83—84, which is the set adjacent the stop 67, engages and starts advancing the second sheet towards the front sets of feed rolls 83 and 84. The latter sets continue the feed of the second set until the leading edge thereof strikes the #2 stop 110 (see Fig. 3) at 233°. The #2 stop was moved upwardly into sheet arresting position at 210°, simultaneously with the lowering of the pressure rolls 107 and 128 and apron 127 out of coaction with the platen. The sheet thus enters freely between the platen and pressure rolls until it is arrested by the #2 stop. The #2 stop is out of the way of the second sheet at 240° and the pressure rolls, at the same time, are moved upwardly into coaction with the platen, prepared to cooperate with the platen in feeding the second sheet around the platen into head-spaced position. At 240°, the pin 227 (see Fig. 5) on the disc 225 of cam shaft 32 acts on the arm 229 to cause a second platen clutch engagement during the cycle. The platen now starts its second period of rotation and, by coaction with pressure rolls 107 and 128, feeds the second sheet to head-spaced position, this feeding action terminating at 285° as a result of the action of the pin 253 (see Fig. 5) on the lever 238 to cause release of the platen clutch. The second sheet is now in head-spaced position, ready to be typed on. The #1 stop returned to sheet arresting position at 139°, prepared to arrest the third sheet when the latter is fed out of the hopper. At 220°, the hopper feed cams 48' start to feed the third sheet, or the bottom sheet in the supply hopper, out of the hopper and to the separator rolls 49 and 50 (see Fig. 3). The hopper feed cams, in conjunction with the separator rolls, cause the third sheet to advance until it strikes the #1 stop at 257°. The #1 stop is now in upper, sheet arresting position and remains therefor the rest of the cycle. Thus, the third sheet also remains engaged with the #1 stop until 120° of the next cycle, at which point this stop again is moved out of sheet arresting position.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In combination with a writing unit having printing means and a laterally movable carriage provided with a platen over which a sheet is fed to be printed on by the printing elements, cyclically operable power means, means controlled by the power means to insert a sheet on the platen, and means for initiating a cycle of the power means only when the carriage is in an end position and including a device rendered effective by the carriage when in the end position.

2. In combination with a writing unit having writing means and a laterally movable platen on which a sheet is disposed to be written on by the writing means, automatic power means, means operated by the power means to feed a sheet from a sheet supply and along a laterally restricted feed path to the platen and means for initiating operation of the automatic power means, and means for preventing the power means from being initiated in operation unless the platen is in lateral alinement with said feed path.

3. In combination with a writing unit having printing elements and a laterally movable platen over which a sheet is disposed to be printed on by the printing elements, a storage tray, ejecting means for ejecting a sheet from the platen and into the storage tray along a laterally restricted eject path, and means for rendering the ejecting means effective only when the platen is in lateral alinement with the eject path, so as to compel the platen to be placed in said alinement before the ejecting means may become effective.

4. In combination with a laterally movable carriage provided with a rotatable platen and type elements to type on a sheet disposed around the platen, automatic means to feed sheets successively from a sheet supply to head-spaced position around the platen, electrical means including a starting circuit to cause operation of the feeding means, and a switch in the circuit closed under control of the carriage only while the carriage is in a predetermined lateral position and remaining open, to prevent making of the starting circuit, while the carriage is in any other lateral position.

5. Recording apparatus including a sheet support and recording elements to record on a sheet lying on said support, in combination with sheet feeding apparatus including automatic, cyclically operable power mechanism, paired completely round feed rolls initially spaced apart and out of feeding coaction, means operated by the power mechanism for continually rotating at least one of said feed rolls during the cycle, means controlled by the power mechanism for bringing said paired feed rolls together, while at least one of them is in rotation, into feeding coaction during a predetermined period of the cycle, rotation of the paired feed rolls during their period of coaction advancing a sheet towards the sheet support, and means operated by the power mechanism for causing the sheet advanced by the feed rolls to be fed to writing position on the sheet support.

6. Recording apparatus including a laterally shiftable carriage provided with a rotary platen and its shaft, in combination with automatic, power mechanism, means for coupling the mechanism to the platen shaft for effecting rotation of the platen comprising a tooth-engaging element and a coacting tooth element, one of said elements being connected to the platen shaft for engaging the other element when the carriage is in a predetermined lateral position thereby to couple the platen to the power mechanism for rotation by the mechanism, and means, including a device controlled by the carriage when in said predetermined lateral position, for setting the power mechanism in operation.

7. In combination with the line-spacing platen of a key-operated recording machine, a sheet feeding mechanism comprising feeding elements to feed one sheet at a time from a supply stack to the platen, cyclically operable power means to operate the feeding elements each cycle for feeding a sheet to the platen, a clutch magnet energized to set the power means in operation for a cycle, a member operatively connected to the platen, and a circuit for energizing the magnet and including a switch temporarily closed by said member only while the platen occupied a predetermined position and remaining open with the platen in any other position so as to prevent making of the circuit.

8. In a recording apparatus, a rotary platen, a pressure roll above the recording line and having a normal position of coaction with the platen to feed a sheet during rotation of the platen, means for mounting the pressure roll and platen for relative separating movement to provide a clear space between the platen and pressure roll for a sheet to be moved therebetween, cyclically operable automatic, power mechanism, means operated by the power mechanism for feeding a sheet during the cycle to insert the leading end of the sheet between the platen and pressure roll, and means operated by said power mechanism during the cycle for causing the relative separating movement between the platen and pressure roll to separate them while the feed means is feeding a sheet therebetween and for causing the platen and pressure roll to return to normal feeding coaction after the sheet has been inserted therebetween.

9. A recording apparatus comprising a rotary platen, a pressure roll above the recording line and having a normal position of coaction with the platen to feed a sheet during rotation of the platen, and means for mounting the pressure roll for movement forwardly of the platen to provide a clear space therebetween for a sheet to be inserted and to serve to guide the sheet towards the platen, in combination with automatic mechanism for feeding a sheet from a supply stack to the platen and inserting the sheet between the platen and pressure roll, and means for automatically moving the pressure roll forwardly of and away from the platen just before the leading edge of the sheet reaches the pressure roll and for returning the pressure roll to normal position after the sheet has moved into position between the pressure roll and platen.

10. A recording apparatus comprising a rotary platen and a pressure roll coacting with the platen to feed a sheet and located above the recording line and in which the pressure roll is mounted for movement to a position in front of and away from the platen, in combination with a cyclically operable power mechanism, means operated by the power mechanism to insert a sheet between the platen and pressure roll, and means operated by the power mechanism in timed relation to the sheet inserting means for automatically moving the pressure roll temporarily away from and in front of the platen to enable the leading edge of the sheet to be inserted freely between the platen and pressure roll.

11. A recording apparatus comprising a rotary platen, a pair of guides above the recording line coacting to guide a sheet fed upwardly from the platen, in combination with automatic means below the guides to feed the sheet upwardly from the platen and towards the guides, cyclically operable mechanism for operating the feed means to feed the sheet during a cycle towards and into position between the guides, and means operable by the cyclical mechanism during the same cycle in timed relation to the automatic feed means for automatically and temporarily spacing said guides further apart to insure the leading end of the sheet freely entering between the guides and for then causing the guides, after the sheet has been inserted therebetween and before the end of the cycle, to return to normal spacing relation.

ALBERT W. MILLS.
FRANK J. FURMAN.
SIGURD L. WALSOE.